(12) United States Patent
Haydt et al.

(10) Patent No.: US 12,498,184 B2
(45) Date of Patent: Dec. 16, 2025

(54) UNIFORM CHEMICAL MILLING

(71) Applicant: RTX Corporation, Arlington, VA (US)

(72) Inventors: Shane E. Haydt, Manchester, CT (US); Brian A. Fisher, West Hartford, CT (US)

(73) Assignee: RAYTHEON TECHNOLOGIES CORPORATION, Arlington, VA (US)

( * ) Notice: Subject to any disclaimer, the term of this patent is extended or adjusted under 35 U.S.C. 154(b) by 148 days.

(21) Appl. No.: 18/228,218

(22) Filed: Jul. 31, 2023

(65) Prior Publication Data

US 2024/0410661 A1 Dec. 12, 2024

Related U.S. Application Data

(60) Provisional application No. 63/471,828, filed on Jun. 8, 2023.

(51) Int. Cl.
| | | |
|---|---|---|
| *F28F 9/02* | (2006.01) | |
| *B33Y 40/20* | (2020.01) | |
| *B33Y 80/00* | (2015.01) | |

(52) U.S. Cl.
CPC ............ *F28F 9/0268* (2013.01); *B33Y 40/20* (2020.01); *B33Y 80/00* (2014.12); *F28F 2255/00* (2013.01)

(58) Field of Classification Search
CPC ..... F28F 9/0268; F28F 2255/00; B33Y 40/20; B33Y 80/00
USPC .......................................... 165/99, 174, 175
See application file for complete search history.

(56) References Cited

U.S. PATENT DOCUMENTS

| | | | | | |
|---|---|---|---|---|---|
| 2,602,647 | A | * | 7/1952 | Miller | ........................ B01J 8/44 165/111 |
| 2,934,322 | A | * | 4/1960 | Hazard | ................. F28D 1/0308 62/436 |
| 4,027,821 | A | * | 6/1977 | Hayes | ................... F24S 10/506 165/104.31 |
| 4,120,351 | A | * | 10/1978 | Kleine | ................. B21D 53/045 165/170 |
| 4,522,252 | A | * | 6/1985 | Klaren | .................... F28F 13/06 422/198 |
| 4,600,053 | A | * | 7/1986 | Patel | ........................ F28F 3/08 29/890.039 |
| 5,186,249 | A | * | 2/1993 | Bhatti | .................... F28F 9/0212 165/174 |
| 5,209,289 | A | * | 5/1993 | Haushalter | .............. F28F 13/12 165/166 |
| 5,211,222 | A | * | 5/1993 | Shinmura | ............... F28D 1/035 165/176 |

(Continued)

*Primary Examiner* — Claire E Rojohn, III
(74) *Attorney, Agent, or Firm* — CANTOR COLBURN LLP

(57) ABSTRACT

A method includes additively manufacturing a heat exchanger with a plurality of fluid passages extending in a flow direction through the heat exchanger. The method includes chemical milling interior surfaces of the plurality of fluid passages, wherein chemically milling includes flowing chemical milling fluid through an inlet of and inlet header to an outlet of the inlet header and into the plurality of fluid passages from the outlet of the inlet header. The inlet header includes a diffuser structure in fluid communication between the inlet and the outlet, configured to promote even distribution and flow of the chemical milling fluid from the outlet of the inlet header into the plurality of fluid passages.

8 Claims, 3 Drawing Sheets

(56) References Cited

U.S. PATENT DOCUMENTS

| | | | | |
|---|---|---|---|---|
| 5,287,918 | A * | 2/1994 | Banks | B23K 20/18 |
| | | | | 228/183 |
| 5,419,391 | A * | 5/1995 | Chan | F28D 7/06 |
| | | | | 122/32 |
| 5,465,783 | A * | 11/1995 | O'Connor | F28F 19/00 |
| | | | | 165/174 |
| 5,465,785 | A * | 11/1995 | Adderley | F28D 9/0031 |
| | | | | 165/170 |
| 6,382,313 | B2 * | 5/2002 | Mitsumoto | F28D 7/1623 |
| | | | | 165/158 |
| 6,997,250 | B2 * | 2/2006 | Dilley | F28F 9/0265 |
| | | | | 165/99 |
| 7,143,605 | B2 * | 12/2006 | Rohrer | F25B 5/02 |
| | | | | 62/515 |
| 7,301,770 | B2 * | 11/2007 | Campbell | F28F 3/022 |
| | | | | 257/E23.09 |
| 7,343,965 | B2 * | 3/2008 | Memory | F28D 9/005 |
| | | | | 165/166 |
| 9,976,815 | B1 * | 5/2018 | Roper | F28D 7/08 |
| 10,281,219 | B2 * | 5/2019 | Mizushita | F28F 3/08 |
| 10,724,802 | B2 * | 7/2020 | Courtial | F28F 9/0221 |
| 10,801,790 | B2 * | 10/2020 | Streeter | B33Y 80/00 |
| 11,371,786 | B2 * | 6/2022 | Johns | F28F 9/0268 |
| 11,486,657 | B2 * | 11/2022 | Kim | F28F 3/046 |
| 11,493,286 | B1 * | 11/2022 | Kirsch | F28F 7/02 |
| 11,686,530 | B2 * | 6/2023 | Streeter | F28D 1/0476 |
| | | | | 165/174 |
| 2004/0182548 | A1 * | 9/2004 | Lovette | H01L 23/473 |
| | | | | 257/E23.098 |
| 2007/0039724 | A1 * | 2/2007 | Trumbower | F28F 9/0273 |
| | | | | 62/515 |
| 2010/0025026 | A1 * | 2/2010 | Dietz | F28F 9/026 |
| | | | | 165/166 |
| 2010/0139900 | A1 * | 6/2010 | Thompson | F28D 9/0043 |
| | | | | 165/166 |
| 2015/0020996 | A1 * | 1/2015 | Miller, Jr. | F28F 13/06 |
| | | | | 165/41 |
| 2015/0107801 | A1 * | 4/2015 | Campbell | H05K 7/2039 |
| | | | | 165/104.19 |
| 2015/0122465 | A1 * | 5/2015 | Mori | F28F 9/0243 |
| | | | | 165/104.33 |
| 2016/0146162 | A1 * | 5/2016 | Janke | F02M 26/28 |
| | | | | 165/174 |
| 2017/0363361 | A1 * | 12/2017 | Turney | F28D 7/0025 |
| 2019/0128768 | A1 * | 5/2019 | McNeilly | F28F 27/00 |
| 2019/0154345 | A1 * | 5/2019 | Martinez | B33Y 80/00 |
| 2019/0360759 | A1 * | 11/2019 | Collins | H01L 23/473 |
| 2020/0370836 | A1 * | 11/2020 | Crayssac | F25J 5/002 |
| 2021/0231376 | A1 * | 7/2021 | Colson | F28F 7/02 |
| 2022/0170706 | A1 * | 6/2022 | Catuneanu | F28F 3/048 |
| 2024/0118047 | A1 * | 4/2024 | Haydt | F28F 25/02 |
| 2024/0153846 | A1 * | 5/2024 | Bodla | G06F 1/20 |
| 2024/0295362 | A1 * | 9/2024 | Byfield | F28F 7/02 |
| 2024/0410661 | A1 * | 12/2024 | Haydt | F28F 9/0268 |
| 2025/0123062 | A1 * | 4/2025 | Catuneanu | H01M 10/625 |

* cited by examiner

UNIFORM CHEMICAL MILLING

CROSS REFERENCE TO RELATED APPLICATIONS

This application claims priority to U.S. Provisional Patent Application No. 63/471,828, filed Jun. 8, 2023. The entire contents of this application are incorporated herein by reference in their entirety.

STATEMENT OF GOVERNMENT RIGHTS

This invention was made with government support under Contract No. FA8650-20-2-5700 awarded by the United States Air Force. The government has certain rights in the invention.

BACKGROUND

1. Field

The present disclosure relates to heat exchangers, and more particularly to additive manufactured heat exchangers.

2. Description of Related Art

Additive manufacturing is commonly used to create heat exchangers due to its ability to create small channels with intricate geometries. A significant disadvantage of using additive manufacturing to make heat exchangers is the pressure drop incurred by the large-scale roughness features deposited by the additive manufacturing process. While roughness can be affected by the choice of process parameters, post-processing techniques are needed to significantly reduce the large-scale roughness features in the flow passages of additively manufactured heat exchangers.

Conventional post-processing techniques can be applied to additively manufactured heat exchangers and have been considered satisfactory for their intended purpose. However, there is an ever present need for improved systems and methods for additively manufacturing heat exchangers. This disclosure provides a solution for this need.

SUMMARY

An apparatus includes an inlet header including an inlet, an outlet, and a diffuser structure in fluid communication between the inlet and the outlet. The diffuser structure is configured to promote even distribution and flow of fluid from the outlet into a plurality of fluid passages of an additively manufactured heat exchanger.

The heat exchanger can be included, wherein the inlet header and the heat exchanger are a single monolithic build. The single monolithic build can include an outlet header at an outlet end of the heat exchanger. The outlet header can include one inlet for collecting chemical milling fluid from all of the plurality of fluid passages, and one outlet for outletting the chemical milling fluid. The outlet header can have no diffuser structure like the diffuser structure of the inlet header.

The diffuser structure can include a pin-fin array defined by a plurality of pin-fins extending across an interior space of the inlet header. The pin-fin array can include a plurality of chevron shaped pin-fins. Each chevron shaped pin-fin can have a upstream, downstream, or lateral pointing apex relative to a flow direction from the inlet of the inlet header to the outlet of the inlet header. Each chevron shaped pin-fin can define an oblique angle with each of two opposed lateral walls bounding the interior space of the inlet header. The pin-fin array can be defined in a funnel shaped interior space of the inlet header that is between the inlet and the outlet. The pin-fin array can define a regular pattern in the funnel shaped interior space. The funnel shaped interior space can be laterally bounded by diverging funnel walls. The funnel walls can each have a chevron apex edge conforming to the pin-fin array. Each chevron shaped pin-fin in the pin-fin array can have a pin cross-section that is uniform except one or more chevron shaped pin-fins closest to the inlet of the inlet header, which have enlarged pin cross-sections relative to the pin cross-section for erosion resistance.

A method includes additively manufacturing a heat exchanger with a plurality of fluid passages extending in a flow direction through the heat exchanger. The method includes chemical milling interior surfaces of the plurality of fluid passages, wherein chemically milling includes flowing chemical milling fluid through an inlet of and inlet header to an outlet of the inlet header and into the plurality of fluid passages from the outlet of the inlet header. The inlet header includes a diffuser structure in fluid communication between the inlet and the outlet, configured to promote even distribution and flow of the chemical milling fluid from the outlet of the inlet header into the plurality of fluid passages.

Additively manufacturing the heat exchanger can include additively manufacturing an inlet header together with the heat exchanger in a single monolithic build. The method can include removing the inlet header from the heat exchanger after the chemical milling. The method can include additively manufacturing an outlet header at an outlet end of the plurality of fluid passages. The outlet header can include one inlet for collecting chemical milling fluid from all of the plurality of fluid passages, and one outlet for outletting the chemical milling fluid. The outlet header can have no diffuser structure like the diffuser structure of the inlet header. The method can include removing the inlet header and the outlet header from the heat exchanger after completion of the chemical milling. The chemical milling can include connecting the inlet of the inlet diffuser in fluid communication with a chemical milling system to receive chemical milling fluid from the chemical milling system.

The diffuser structure can include a pin-fin array defined by a plurality of pin-fins extending across an interior space of the inlet header. The pin-fin array can include a plurality of chevron shaped pin-fins. Each chevron shaped pin-fin can have a upstream pointing apex relative to a flow direction from the inlet of the inlet header to the outlet of the inlet header. Each chevron shaped pin-fin can define a 45° angle with each of two opposed lateral walls bounding the interior space of the inlet header. The pin-fin array can be defined in a funnel shaped interior space of the inlet header that is between the inlet and the outlet. The pin-fin array can define a regular pattern in the funnel shaped interior space. The funnel shaped interior space can be laterally bounded by diverging funnel walls. The funnel walls can each have a chevron apex edge conforming to the pin-fin array. Each chevron shaped pin-fin in the pin-fin array can have a pin cross-section that is uniform except one or more chevron shaped pin-fins closest to the inlet of the inlet header, which has/have enlarged pin cross-sections relative to the pin cross-section for erosion resistance.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
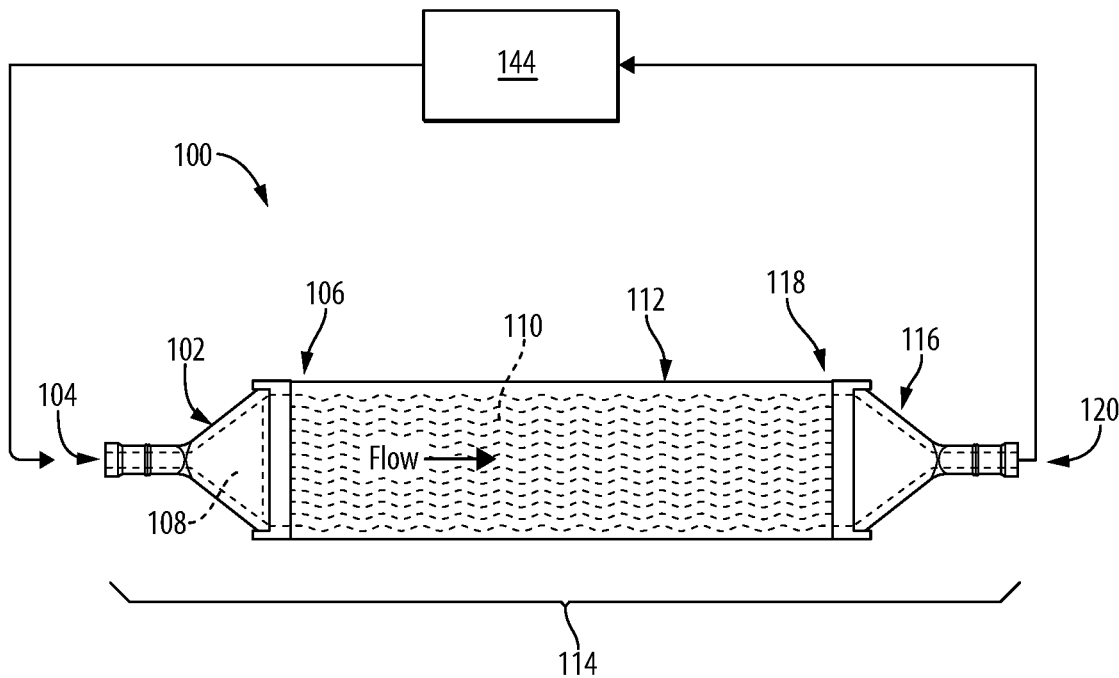
FIG. 1 is a schematic plan view of an embodiment of an apparatus constructed in accordance with the present disclosure, showing a monolithic build of a heat exchanger, inlet header, and outlet header.

Reference will now be made to the drawings wherein like reference numerals identify similar structural features or aspects of the subject disclosure. For purposes of explanation and illustration, and not limitation, a partial view of an embodiment of an apparatus in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to provide surface finishing for internal passages in heat exchangers, which for purposes herein includes cold plates and other like thermal management devices, and the like that are additively manufactured.

Chemical milling is a subtractive manufacturing process that uses etching chemicals flowed through internal channels to remove material from internal surfaces, and in doing so, reducing surface roughness. The inclusion of chemical milling as a post-processing routine for additively manufactured heat exchangers as disclosed herein has the potential to reduce pressure drop for the heat exchangers when they are used in heat exchanger operation, which generally improves heat exchanger performance. The flow-rate of the etching fluid in a chemical milling system is not guaranteed by many chemical milling system vendors and can be considered as unknown to the heat exchanger designer. Even if the overall flow rate is well controlled, the flow distribution within the complex heat exchanger geometry may not be uniform. Beyond a certain threshold flow-rate, the etching fluid will emerge from a pipe of the chemical milling system pipe as a jet, which if left unaddressed is biased towards the center channels of a heat exchanger causing non-uniform material removal. It is important to reliably achieve uniform material removal from all of the heat exchanger passages, independent of the chemical milling process, system, and vendor.

The apparatus 100 includes an inlet header 102 including an inlet 104, an outlet 106, and a diffuser structure 108 in fluid communication between the inlet 104 and the outlet 106. The diffuser structure 108 is configured to promote even distribution and flow of fluid, such as chemical milling or etching fluid, from the outlet 106 into a plurality of fluid passages 110 of an additively manufactured heat exchanger 112, e.g. along the flow direction identified by the flow arrow in FIG. 1.

The heat exchanger 112 and the inlet header 102 can both be parts of single monolithic build 114. The single monolithic build 114 includes an outlet header 116 at an outlet end of the heat exchanger 112 relative to the flow direction indicated by the flow arrow in FIG. 1. The outlet header 116 includes one inlet 118 for collecting chemical milling fluid, or other fluid, from all of the plurality of fluid passages 110, and one outlet 120 for outletting the chemical milling fluid or other fluid. The outlet header 116 has no diffuser structure like the diffuser structure 108 of the inlet header 108. Note that while it is shown in FIG. 1 with a straight flow direction through the heat exchanger 112, not all heat exchangers follow a straight flow direction, and the heat exchanger can turn the flow internally. Those skilled in the art will also readily appreciate that the headers 102, 116 do not have to be coaxial with the heat exchanger core, and such configurations do not depart from the scope of this disclosure.

Figure 2:
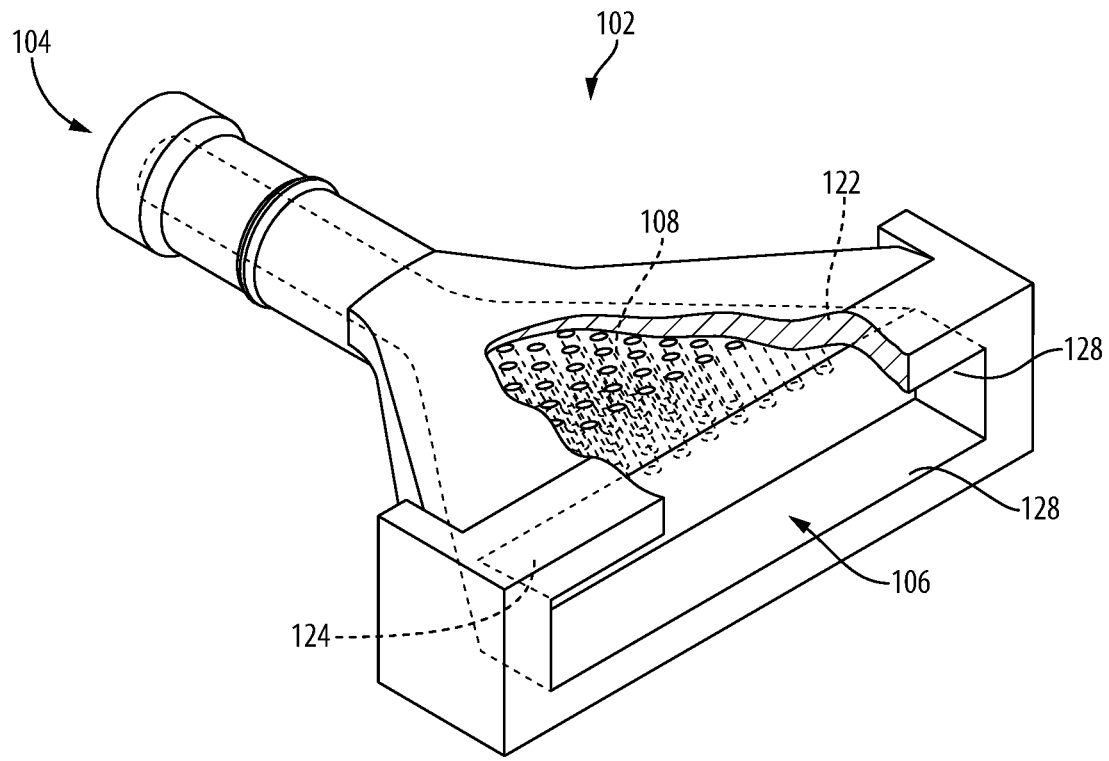
FIG. 2 is a schematic perspective view of the inlet heater of FIG. 1, showing the internal pin-fins and other internal structure in broken lines.
Figure 3:
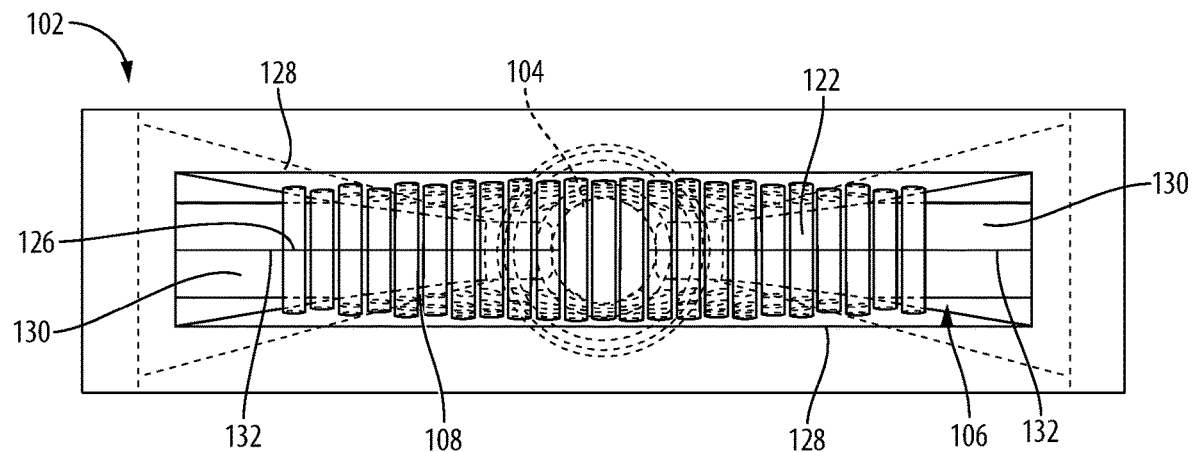
FIG. 3 is an axial end view of the inlet header of FIG. 1, showing the outlet of the inlet header.

With reference now to FIG. 2, the diffuser structure 108 includes a pin-fin array defined by a plurality of pin-fins 122, not all of which are numbered for sake of clarity in the drawings, extending across an interior space 124 of the inlet header 102. The pin-fin array diffuses high momentum flow through the diverging interior space 124 of the inlet header 102. The pin-fins 122 are chevron shaped, where the chevron shape is shown in particular in FIGS. 4 and 6. Each chevron shaped pin-fin 122 has a upstream pointing apex 126 relative to a flow direction from the inlet 104 to the outlet 106 of the inlet header 102. It is also contemplated that the chevron apices 126 could point downstream e.g. for reversing the build direction labeled in FIG. 4, laterally relative to the flow direction indicated in FIG. 1, e.g. for building in the direction labeled "possible build direction" in FIG. 4, or any other suitable direction.

Figure 4:
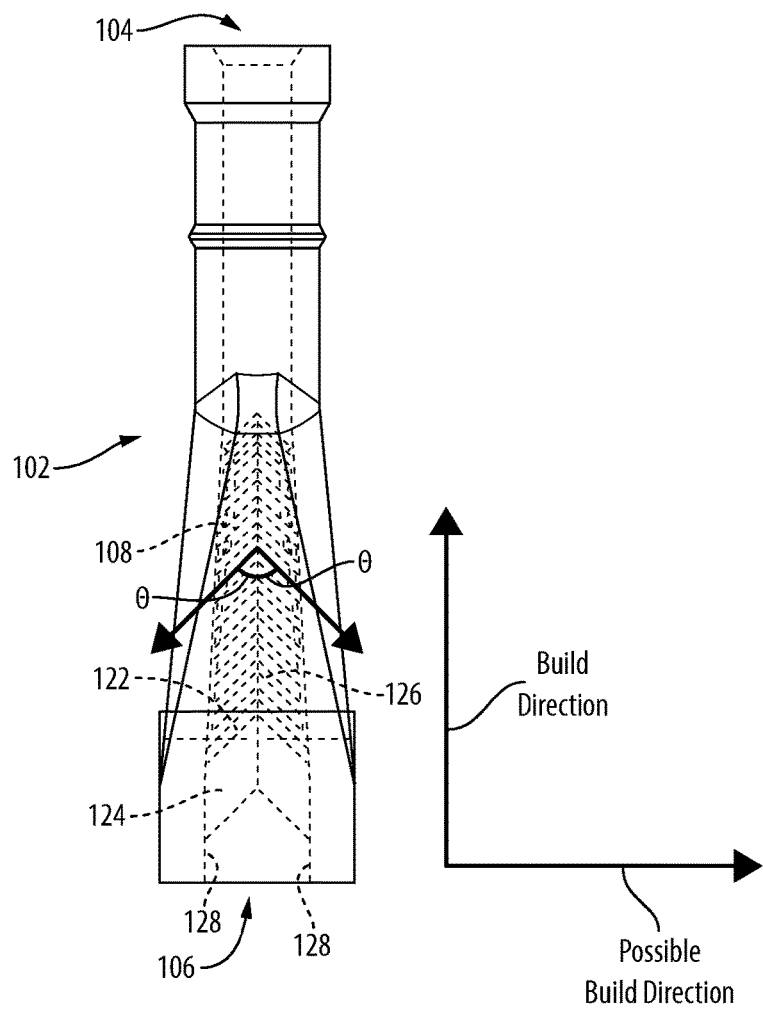
FIG. 4 is a side-elevation view of the inlet header of FIG. 1, showing the chevron angle of the pin-fins.
Figure 5:
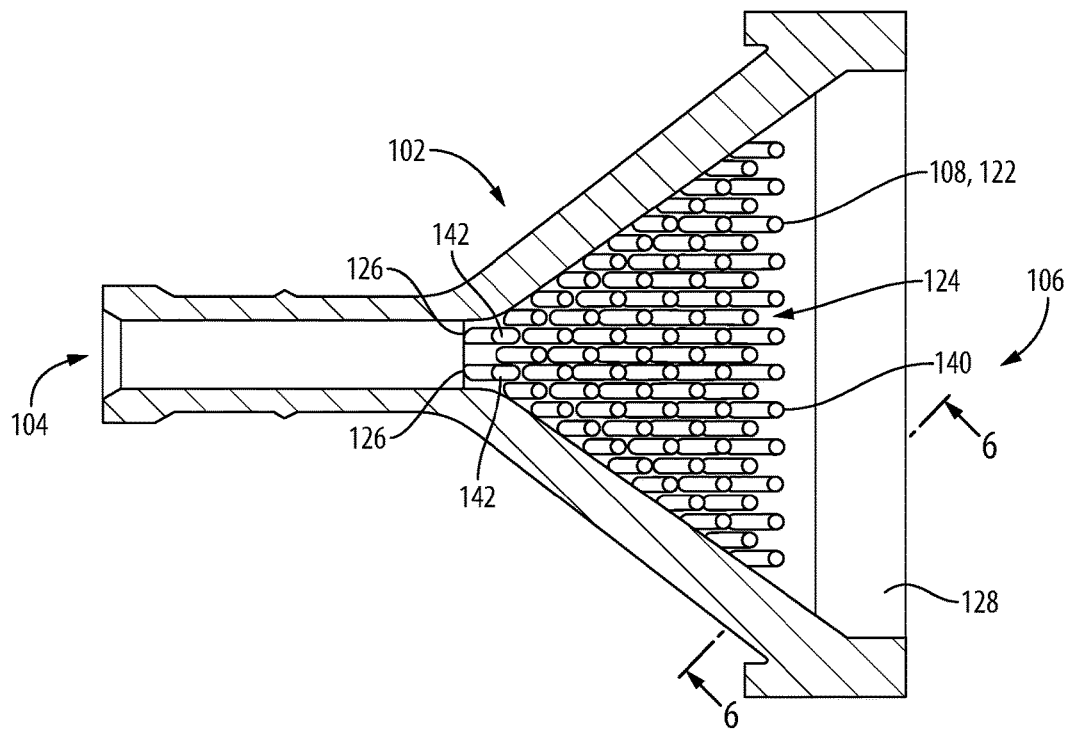
FIG. 5 is a cross-sectional plan view of the inlet header of FIG. 1, showing he cross-sectional shapes of the pin-fins.

More traditional pin-fins are perpendicular to the flow direction, but each half of the chevron shaped pin-fins 122 provide an oblique angle $\theta$ labeled in FIG. 4, e.g., 45°, for buildability in additive manufacturing. Any suitable angle $\theta$ can be conceived of and may aid in buildability depending on the print direction relative to the chemical milling flow direction. The pin fins 122 are each in a chevron shape to create a symmetric obstruction to the flow and to help prevent biasing to the top or bottom of the channel through the inlet header 102. Each chevron shaped pin-fin 122 defines an angle $\theta$ with each of two opposed parallel, triangular lateral walls 128 bounding the interior space 124 of the inlet header 102. The pin-fin array is defined in the interior space 124, which is funnel shaped. The pin-fin array defines a regular pattern, shown in cross-sectioning FIG. 5 for example, in the funnel shaped interior space 124, where the pin-fins 122 are arranged in ordered, regularly spaced rows and columns. The funnel shaped interior space 124 is laterally bounded by diverging funnel walls 130, visible and labeled in FIG. 3. The funnel walls 130 each have a chevron apex edge 132 formed between upper and lower surfaces 134, 136 as oriented in FIG. 6, which gives the funnel walls 130 a shape conforming to the chevron shape of the pin-fin array. These chamfers in the funnel walls 130 match the angles of the pin-fins 122 to keeps flow from biasing to the corners 138 of the interior space 124. Note that the shape of the funnel walls 130 can change if needed for a different the build direction, but the shape of the funnel walls 130 can provide flow benefits by conforming to the shape and orientation of the pins.

Figure 6:
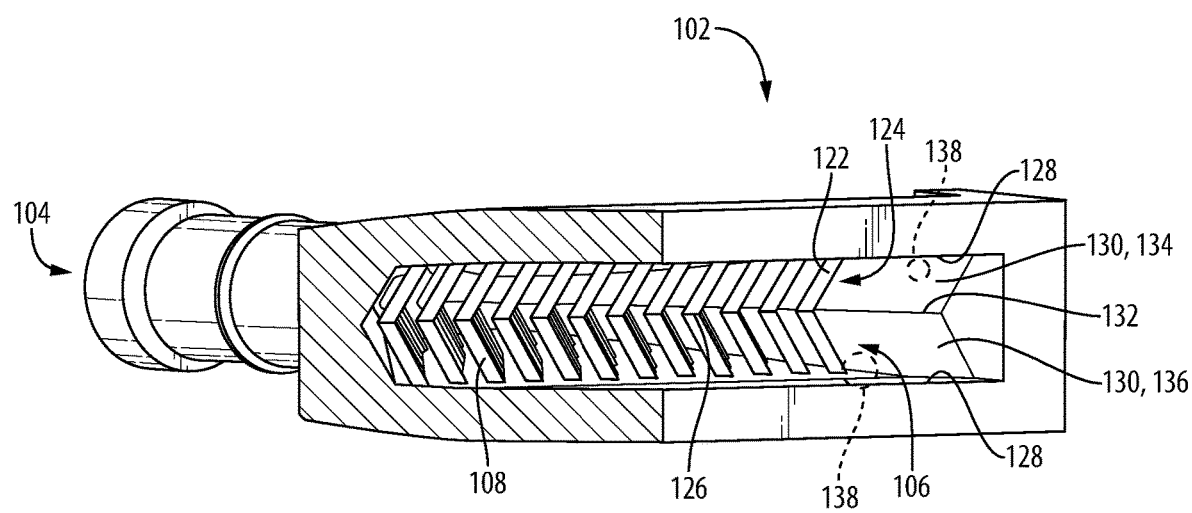
FIG. 6 is a cross-sectional perspective view of the inlet header of FIG. 1, showing the cross-section taken along the section line indicated in FIG. 5.

Each chevron shaped pin-fin 122 in the pin-fin array has a pin cross-section 140 (labeled in FIG. 5) that is uniform from top to bottom as oriented in FIG. 6, and uniform from one pin-fin 122 to the next. There are however two pin-fins 122 closest to the inlet 104 of the inlet header 120, which have enlarged pin cross-sections 142 relative to the pin cross-section 140 of the rest of the pin-fins 122 for erosion resistance, since these two pin fins are at the leading edge of the pin-fin array. The added stock on the pin-fins 122 at the leading edge of the array account for any extra removal due to impingement from the concentrated flow from the inlet 104 of the inlet header 102. Those skilled in the art will readily appreciate that any suitable number of the pin-fins 122 can have enlarged cross-sections, i.e. any suitable number of the pin-fins 122 in the highest momentum portion of the flow can be enlarged, and those skilled in the art will readily appreciate that it is possible to grade the pin sizes, spacing, and cross-sections based on known removal rate versus flow rate once established. Those skilled in the art will also readily appreciate that the pin-fins can have a non-uniform cross section along their length, e.g. optimized to known erosion rate.

With reference again to FIG. 1, a method includes additively manufacturing a heat exchanger 112 with a plurality of fluid passages 110 extending in a flow direction, indicated by the flow arrow in FIG. 1, through the heat exchanger 112. The method includes chemical milling interior surfaces of the plurality of fluid passages 110, e.g. with chemical etching fluid flowing through the fluid passages 110. Chemically milling includes flowing chemical milling fluid through an inlet 104 of and inlet header 102 to an outlet 106 of the inlet header 102 and into the plurality of fluid passages 110 from the outlet 106 of the inlet header 102. The inlet header 102 includes a diffuser structure 108 as describe above in fluid communication between the inlet 104 and the outlet 106, configured to promote even distribution and flow of the chemical milling fluid from the outlet 106 of the inlet header 102 into the plurality of fluid passages 110.

Additively manufacturing the heat exchanger 110 includes additively manufacturing an inlet header 102 as described above together with the heat exchanger 112 in a single monolithic build. The method includes additively manufacturing an outlet header 116, as described above, at an outlet end of the plurality of fluid passages 110 as part of the same monolithic build with the heat exchanger 110 and the inlet header 102. The outlet header 116 includes one inlet 118 for collecting chemical milling fluid from all of the plurality of fluid passages 110, and one outlet 120 for outletting the chemical milling fluid. The method includes removing the inlet header 102 and the outlet header 116 from the heat exchanger 112 after completion of the chemical milling. It is not necessary to always remove the headers 102, 116, and the pin-fin array may be optimized for chemical milling, subsequent finishing operations, and/or intended use if the headers 102, 116 are left attached to the heat exchanger. The chemical milling includes connecting the inlet 104 of the inlet diffuser in fluid communication with a chemical milling system 144 to receive chemical milling fluid from the chemical milling system 144. The chemical milling fluid can be circulated back to the chemical milling system 144 from the outlet 120 of the outlet header 120, where the arrows into and out of the chemical milling system 133 in FIG. 1 indicate the flows to and from the chemical milling system 144.

Systems and methods as disclosed herein provide potential benefits over more traditional systems and methods, including the following potential benefits. Adding a dense pin-fin array to the header can diffuse high momentum etching fluid and uniformly distribute it into all of the heat exchanger channels. Creating the pin-fins in a chevron shape allows the header to be additively manufactured along a plurality of build directions, e.g. where two example build directions are indicated in FIG. 4. Systems and methods as disclosed herein reduce reliance on expensive and difficult processes to control flow from various chemical milling systems from various chemical milling venders. Pin-fin arrays allow for even output flow over a range of chemical milling flow rates, so the inlet header relaxes the control requirements for the chemical milling system, allows for a wider variety of chemical milling systems to be used to finish a given heat exchanger, and allows for a wider variety of heat exchangers to be chemical milled by a given chemical milling system. Systems and methods as disclosed herein can reduce the required size of the inlet header, saving cost on the printing process, since without the pin-fins, the header would have to diffuse more slowly, and would therefore have to be very long.

The methods and systems of the present disclosure, as described above and shown in the drawings, provide for surface finishing for internal passages in heat exchangers and the like that are additively manufactured. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An apparatus comprising:
an inlet header including an inlet, an outlet, and a diffuser structure in fluid communication between the inlet and the outlet, wherein the diffuser structure is configured to promote even distribution and flow of fluid from the outlet into a plurality of fluid passages of an additively manufactured heat exchanger;
wherein the diffuser structure includes a pin-fin array defined by a plurality of pin-fins extending across an interior space of the inlet header;
wherein the pin-fin array includes a plurality of chevron shaped pin-fins, wherein each chevron shaped pin-fin has a upstream, downstream, or lateral pointing apex relative to a flow direction from the inlet of the inlet header to the outlet of the inlet header.

2. The apparatus as recited in claim 1, further comprising the heat exchanger, wherein the inlet header and the heat exchanger are a single monolithic build.

3. The apparatus as recited in claim 2, further including an outlet header at an outlet end of the heat exchanger, wherein the outlet header includes one inlet for collecting chemical milling fluid from all of the plurality of fluid passages, and one outlet for outletting the chemical milling fluid.

4. The apparatus as recited in claim 3, wherein the outlet header has no diffuser structure like the diffuser structure of the inlet header.

5. The apparatus as recited in claim 1, wherein each chevron shaped pin-fin defines an oblique angle with each of two opposed lateral walls bounding the interior space of the inlet header.

6. The apparatus as recited in claim 1, wherein the pin-fin array is defined in a funnel shaped interior space of the inlet header that is between the inlet and the outlet, wherein the pin-fin array defines a regular pattern in the funnel shaped interior space.

7. The apparatus as recited in claim 6, wherein the funnel shaped interior space is laterally bounded by diverging funnel walls, wherein the funnel walls each have a chevron apex edge conforming to the pin-fin array.

8. The apparatus as recited in claim 1, wherein each chevron shaped pin-fin in the pin-fin array has a pin cross-section that is uniform except one or more chevron shaped pin-fins closest to the inlet of the inlet header, which has/have enlarged pin cross-sections relative to the pin cross-section for erosion resistance.

* * * * *